US011448380B2

(12) United States Patent
Park et al.

(10) Patent No.: US 11,448,380 B2
(45) Date of Patent: Sep. 20, 2022

(54) LIGHT-EMITTING ASSEMBLY WITH TRANSPARENT NANOSTRUCTURED ELECTROCHROMIC POLYMER COLOR FILTER

(71) Applicant: GM GLOBAL TECHNOLOGY OPERATIONS LLC, Detroit, MI (US)

(72) Inventors: Jonglee Park, Troy, MI (US); Jodi M. Allen, Orion, MI (US); Nicholas V. Friszell, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 17/036,852

(22) Filed: Sep. 29, 2020

(65) Prior Publication Data

US 2022/0099269 A1     Mar. 31, 2022

(51) Int. Cl.
| | |
|---|---|
| *F21S 43/20* | (2018.01) |
| *G02F 1/157* | (2006.01) |
| *F21V 9/40* | (2018.01) |
| *F21V 14/00* | (2018.01) |
| *G02F 1/153* | (2006.01) |
| *G02F 1/163* | (2006.01) |
| *B60Q 1/34* | (2006.01) |
| *B60Q 1/30* | (2006.01) |
| *B60Q 1/26* | (2006.01) |
| *F21S 43/14* | (2018.01) |

(Continued)

(52) U.S. Cl.
CPC .......... *F21S 43/255* (2018.01); *B60Q 1/2661* (2013.01); *B60Q 1/30* (2013.01); *B60Q 1/34* (2013.01); *F21S 43/14* (2018.01); *F21V 9/40* (2018.02); *F21V 14/003* (2013.01); *G02F 1/157* (2013.01); *G02F 1/1533* (2013.01); *G02F 1/163* (2013.01); *B60Q 2400/20* (2013.01); *F21W 2103/20* (2018.01); *F21Y 2115/10* (2016.08); *G02F 2203/02* (2013.01); *G02F 2203/055* (2013.01)

(58) Field of Classification Search
CPC ...... F21S 43/255; F21S 43/14; B60Q 1/2661; B60Q 1/30; B60Q 1/34; F21V 14/003; G02F 1/1533; G02F 1/157; G02F 1/163
USPC ......................................................... 362/510
See application file for complete search history.

(56) References Cited

U.S. PATENT DOCUMENTS 7,914,162 B1 * 3/2011 Huang ................... F21V 29/90
                                                                 362/249.02
2007/0120177 A1 * 5/2007 McGregor ........... H01G 9/2031
                                                                 257/321

(Continued)

FOREIGN PATENT DOCUMENTS

DE      102018103819 A1     8/2018

*Primary Examiner* — Bryon T Gyllstrom
(74) *Attorney, Agent, or Firm* — Quinn IP Law

(57) ABSTRACT

A light-emitting assembly configured to generate varied color light includes an assembly housing. The light-emitting assembly also includes a light filter element fixed relative to the assembly housing. The light filter element includes a plurality of transparent nanostructured ElectroChromic (TNEC) layers. When at least one of the plurality of TNEC layers is subjected to voltage, the subject TNEC layer(s) imparts a distinct reflective color to ambient light entering the light-emitting assembly. Such a light-emitting assembly may be specifically adapted for use on a motor vehicle.

16 Claims, 5 Drawing Sheets

(51) Int. Cl.
*F21Y 115/10* (2016.01)
*F21W 103/20* (2018.01)

(56) References Cited

U.S. PATENT DOCUMENTS

| | | | | |
|---|---|---|---|---|
| 2012/0139825 | A1* | 6/2012 | Yashiro | G09G 3/38 |
| | | | | 359/266 |
| 2013/0148371 | A1* | 6/2013 | Kim | F21S 41/125 |
| | | | | 362/510 |
| 2013/0329445 | A1* | 12/2013 | Oh | B60Q 1/2696 |
| | | | | 362/543 |
| 2015/0085467 | A1* | 3/2015 | Tsumori | F21S 43/255 |
| | | | | 362/84 |
| 2016/0223878 | A1* | 8/2016 | Tran | G02F 1/1533 |
| 2020/0057421 | A1* | 2/2020 | Trikha | G02F 1/163 |

* cited by examiner

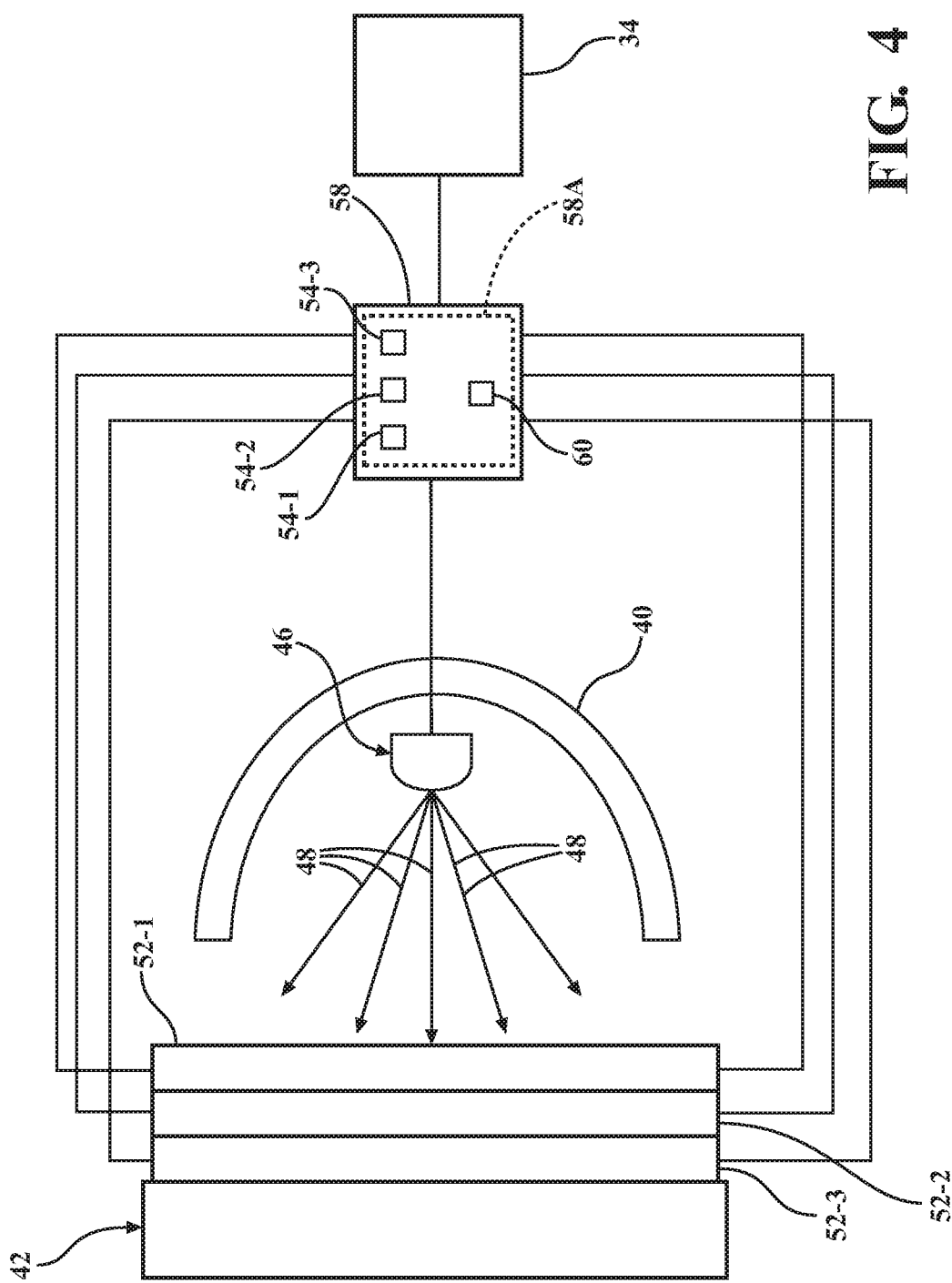

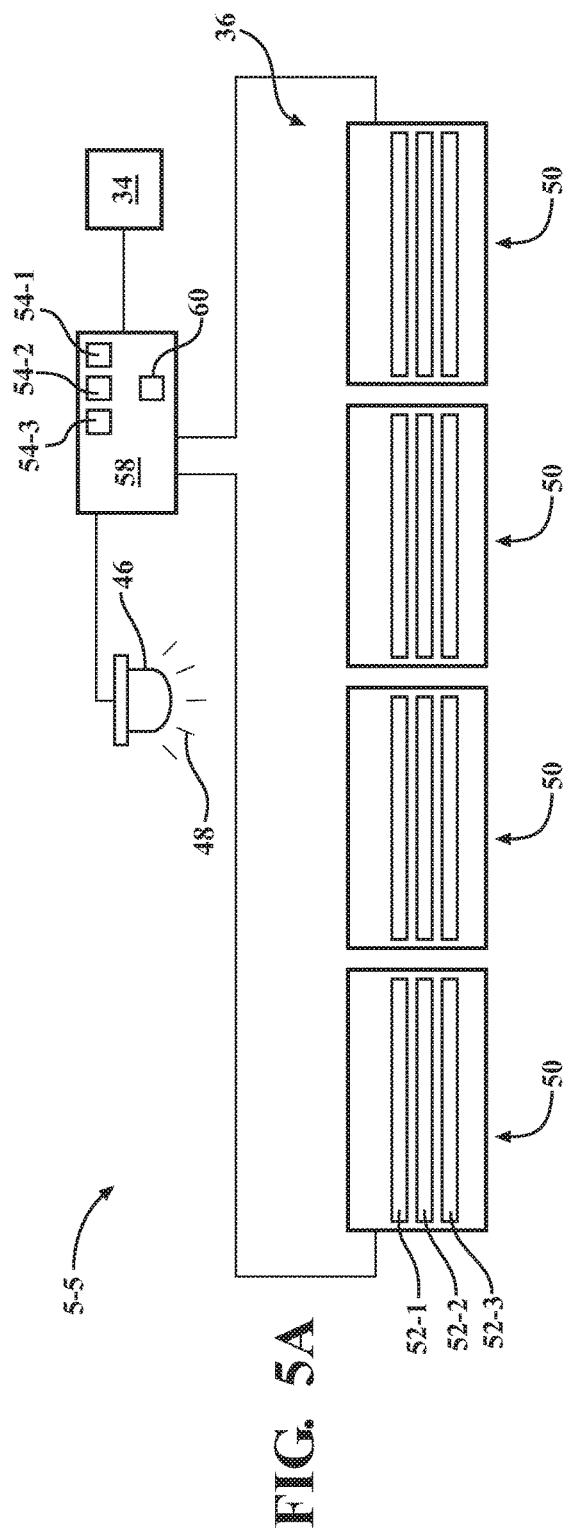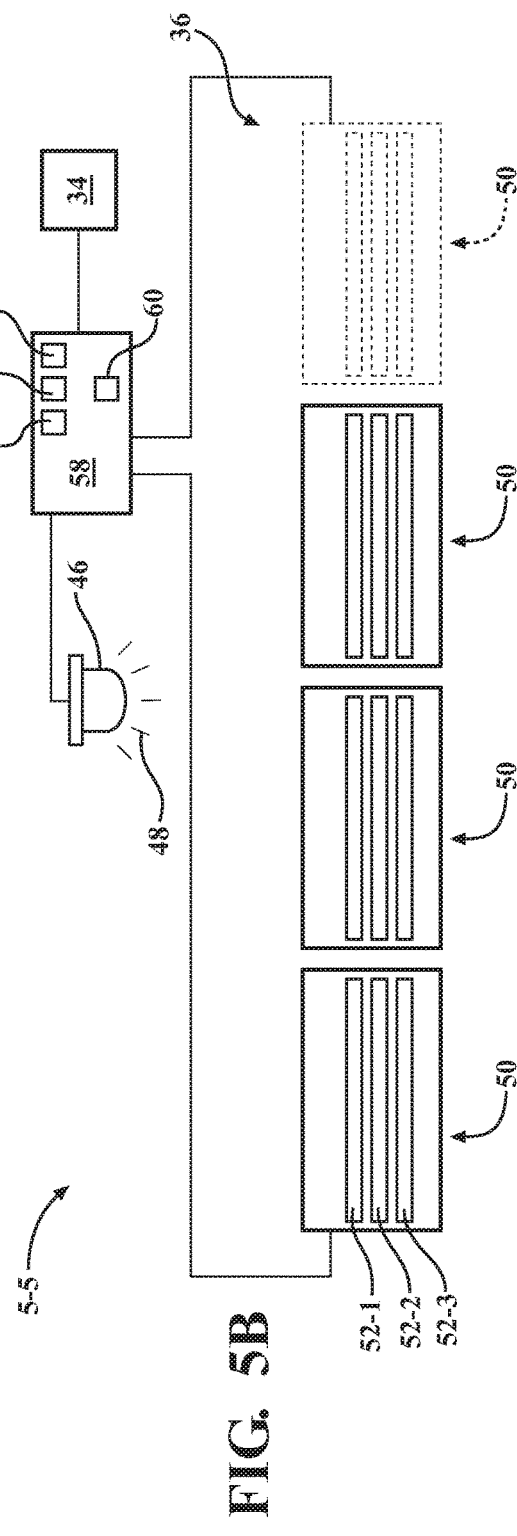

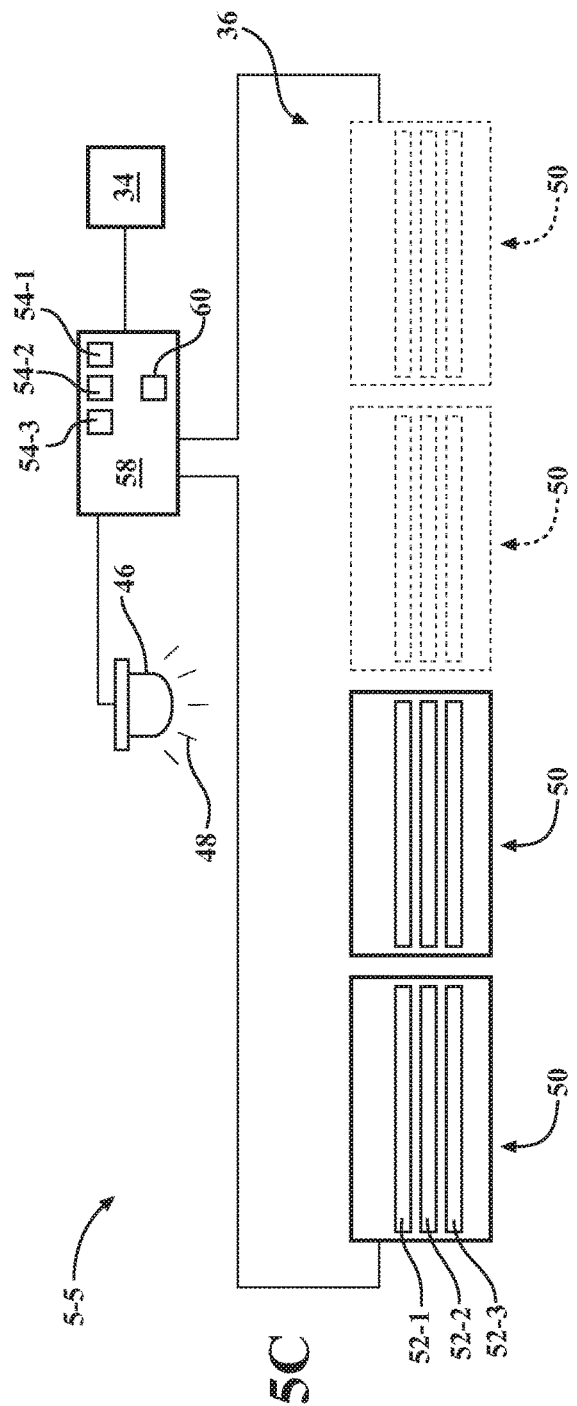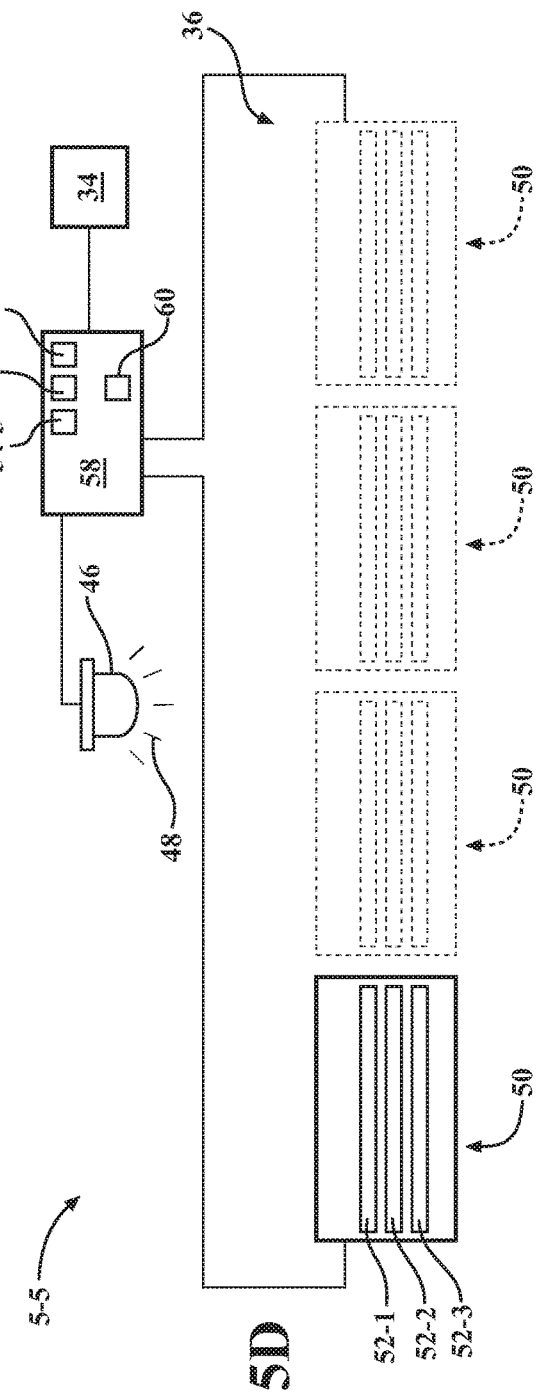

LIGHT-EMITTING ASSEMBLY WITH TRANSPARENT NANOSTRUCTURED ELECTROCHROMIC POLYMER COLOR FILTER

INTRODUCTION

The disclosure relates to a light-emitting assembly having a transparent nanostructured electrochromic polymer color filter for modifying color of the assembly's light beam.

Lighting or illumination is the deliberate use of light to achieve practical or aesthetic effects. Lighting includes the use of both artificial light sources, like lamps and light fixtures, as well as natural illumination by capturing daylight. Lighting may be employed to enhance task performance, improve the appearance of an area, or have positive psychological effects on occupants.

Motor vehicles are typically equipped with exterior lighting systems to provide exterior illumination for the operator to operate the vehicle effectively in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle, for example, to operators of other, approaching vehicles.

Vehicle lighting systems generally include an array of lamp assemblies mounted or integrated to the front, sides, top, and rear of the vehicle. Such an array of lamp assemblies typically includes headlamps arranged to illuminate the road ahead of the vehicle, turn signals arranged to signal the vehicle's intended maneuvering and direction of travel, roof and side marker lamps intended to make visible the vehicle's location and tail lamps, typically defining brake lights for signaling to the rear of the vehicle that the vehicle is slowing or stopping. Such lamp assemblies may employ light-emitting diodes (LEDs) as the light source technology.

SUMMARY

A light-emitting assembly configured to generate varied color light includes an assembly housing. The light-emitting assembly also includes a light filter element fixed relative to the assembly housing. The light filter element includes a plurality of transparent nanostructured ElectroChromic (TNEC) layers. When at least one of the plurality of TNEC layers is subjected to voltage, the subject TNEC layer(s) imparts a distinct reflective color to ambient light entering the light-emitting assembly.

The light-emitting assembly may also include a white light emitting diode (LED) mounted to the assembly housing and configured to generate a beam of light intended to pass through the light filter element. In such an embodiment, when the at least one of the plurality of TNEC layers is subjected to voltage, the subject TNEC layer(s) imparts a distinct transmittance color to the beam of light generated by the white LED and passing through the respective light filter element.

The plurality of TNEC layers may include a first layer configured to impart a cyan color to the beam of light when subjected to a first predetermined magnitude of voltage, a second layer configured to impart a magenta color to the beam of light when subjected to a second predetermined magnitude of voltage, and a third layer configured to impart a yellow color to the beam of light when subjected to a third predetermined magnitude of voltage.

When the second TNEC layer and the third TNEC layer are substantially simultaneously subjected to the respective second and third predetermined magnitudes of voltage, the light filter element may impart a red color to the beam of light.

When the first TNEC layer, the second TNEC layer, and the third TNEC layer are substantially simultaneously subjected to the respective first, second, and third predetermined magnitudes of voltage, the light filter element may impart a black color to the beam of light.

The light-emitting assembly may be mounted on a motor vehicle and configured to define a turn-signal function.

The light-emitting assembly may also include an outer lens affixed to the assembly housing. In such an embodiment, the white LED may be configured to generate the beam of light directed toward the outer lens. Additionally, the light filter element may be arranged between the white LED and the outer lens, and the white LED may be configured to direct the beam of light toward the outer lens.

The light filter element may be affixed to the outer lens.

The light-emitting assembly may be configured to define a Center High Mount Stop Lamp (CHMSL) of a motor vehicle.

The light-emitting assembly may be a tail lamp of a motor vehicle.

The light-emitting assembly may be configured to generate auxiliary lighting of a motor vehicle.

A motor vehicle employing such a light-emitting assembly is also disclosed. Specifically, the light-emitting assembly may have one or more white LEDs along with a plurality of light filter elements. The motor vehicle is further envisioned to include an electric power source and an electronic controller configured to regulate the electric power source and generate voltage across one or more TNEC layers of the plurality of light filter elements. Such generation of voltage across the TNEC layer(s) may be employed to modify color of the beam(s) of light generated by the white LED(s) via each of the plurality of light filter elements.

The electronic controller may be further configured to define a turn-signal function by imparting a black color to the beam(s) of light generated by the white LED(s) sequentially via the plurality of light filter elements.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 4 is a schematic cross-sectional side view of the LED and the light filter element shown in FIG. 3, wherein the LED and the light filter element are connected to a power source and an electronic controller, according to the disclosure.

FIG. 5A is a schematic cross-sectional side view of the light-emitting assembly having one white LED passing its beam of light through a cluster of light filter elements and configured to define a turn-signal function, according to an embodiment of the disclosure.

FIG. 5B is a schematic cross-sectional side view of the light-emitting assembly shown in FIG. 5A, having one light filter in the cluster of light filter elements blacking out the light beam from the white LED, according to an embodiment of the disclosure.

FIG. 5C is a schematic cross-sectional side view of the light-emitting assembly shown in FIG. 5A, having two light filters in the cluster of light filter elements blacking out the light beam from the white LED, according to an embodiment of the disclosure.

FIG. 5D is a schematic cross-sectional side view of the light-emitting assembly shown in FIG. 5A, having three light filters in the cluster of light filter elements blacking out the light beam from the white LED, according to an embodiment of the disclosure.

DETAILED DESCRIPTION

Figure 1:
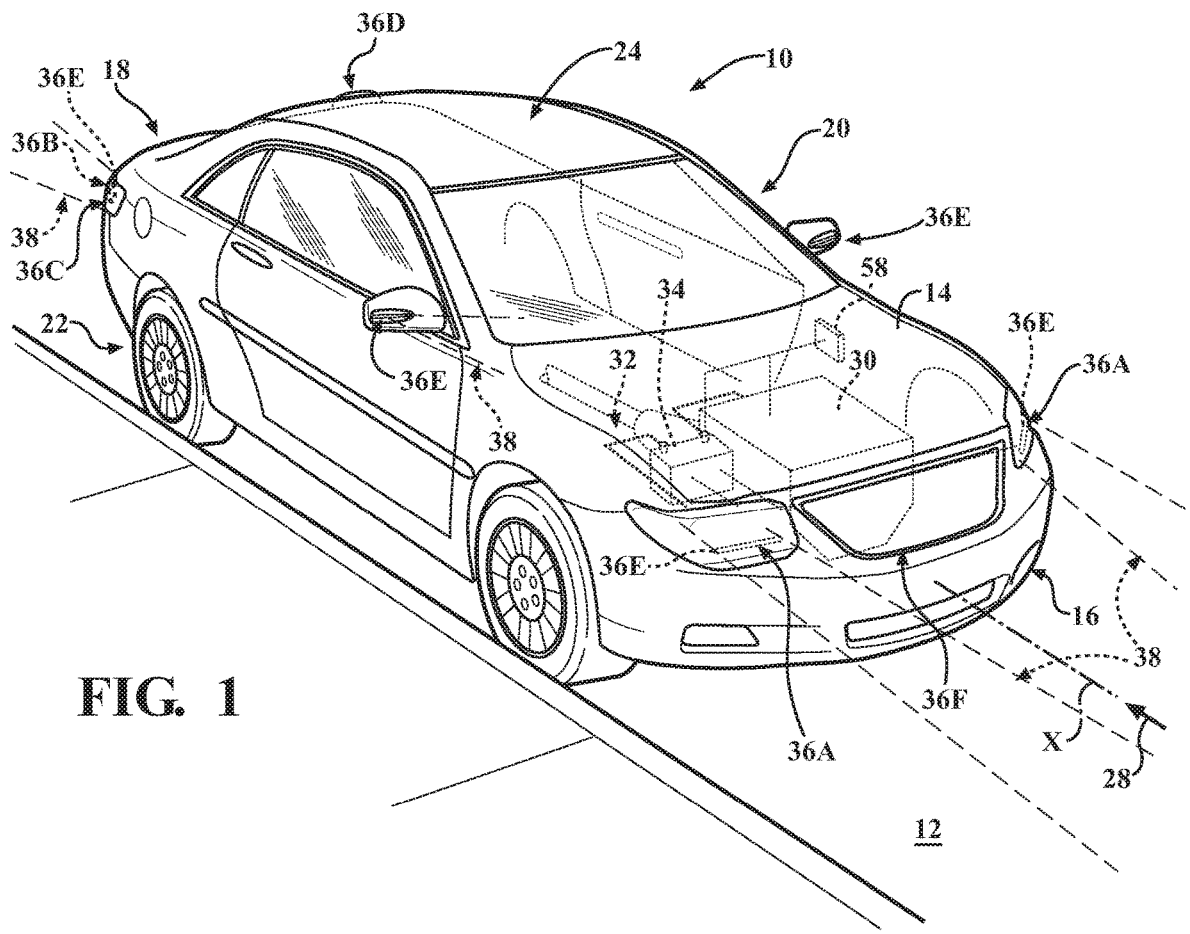
FIG. 1 is a perspective illustration of a motor vehicle having a vehicle body and a plurality of light-emitting assemblies mounted to the vehicle body, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X and substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other, and with respect to the longitudinal axis X, and span the distance between the front end 16 and the rear end 18. The vehicle body 14 is defined to include the longitudinal axis X. A passenger compartment (not shown) of the vehicle 10 is generally bounded by the front and rear ends 16, 18 and the left and right sides 20, 22 of the body 14. The front end 16 is configured to face an oncoming ambient airflow 28 when the vehicle 10 is in motion relative to the road surface 12. When the vehicle 10 is in motion, the oncoming ambient airflow 28 moves substantially parallel to the body 14 and along the longitudinal axis X. As shown, the vehicle 10 may also include a powerplant 30, such as an internal combustion engine, a hybrid-electric powertrain (not shown), or other alternative types of propulsion systems.

As shown in FIG. 1, the vehicle 10 also includes an electrical system 32 having a combined energy storage device 34, which also functions as an electric power source, such as one or more batteries, configured to provide electric power and accept an electric charge. The electrical system 32 is configured to supply electric current to operate vehicle systems, such as exterior lighting that includes a plurality of light-emitting assemblies, generally indicated in FIG. 2 by numeral 36, configured to generate respective light beams 38 (shown in FIG. 1). Other vehicle systems operable via the electrical system 32 may include heating/ventilation/air conditioning (HVAC), vehicle infotainment, as well as various on-board devices, such as a cellular telephone charger, etc., which are not shown.

As shown in FIG. 1, specific light-emitting assemblies providing exterior illumination for the motor vehicle 10 may define vehicle headlamps 36A, tail lamps 36B, stop lamps 36C, Center High Mount Stop Lamp (CHMSL) 36D, turn signals 36E, various auxiliary lighting 36F, and front side, top, and rear side marker lamps (not shown). Additionally, a particular light-emitting assembly 36 may operate as a reflector, i.e., not be the original source of a beam of light, but rather reflect ambient light 39 incident on the subject assembly. Such light-emitting assemblies 36 may indicate the host vehicle's presence, e.g., position, size, and direction of travel, as well as providing signaling functions to indicate the operator's intended maneuvering of the vehicle, for example, to operators of other, approaching vehicles. Although the present disclosure focuses on light-emitting assemblies 36 as employed for exterior lighting of motor vehicles, nothing precludes the light-emitting assembly having the construction described below from being employed in other, automotive or non-automotive, applications.

Generally, headlamps 36A are employed by the vehicle 10 to illuminate the road surface 12 ahead of the vehicle with projected and specifically aimed light beams 38. Tail lamps 36B are generally configured to signal presence of the host vehicle to the vehicle's rear. Tail lamps 36B are required to produce red light and are wired such that they are lit whenever the headlamps 36A are on. Brake lights or stop lamps 36C, frequently incorporated into the tail lamp assemblies 36B, are activated with increased intensity, as compared with the rest of the tail lamp assembly, when the vehicle operator applies the subject vehicle's brakes. Generally, stop lamps 36C are configured as steady-burning lamps that are activated to provide a deceleration warning to drivers following the host vehicle.

The CHMSL 36D is mounted higher than the vehicle's stop lamps 36C and is intended to provide a warning to drivers behind the vehicle 10 whose view of the vehicle's stop lamps is blocked by interceding vehicles. The CHMSL 36D also provides a redundant stop light signal in the event of a malfunction of the stop lamps 36C. The turn signals 36E are generally configured to signal the vehicle's direction of travel and intended maneuvering of the vehicle via repeating light beams. As shown in FIG. 1, turn signals 36E may be standalone units arranged anywhere on the vehicle body 14, or be incorporated into lighting assemblies including the headlamps 36A and/or the tail lamps 36B to impart a turn-signal feature or function for signaling the vehicle's direction of travel to the respective front and rear of the host vehicle. Auxiliary lighting 36F may be part of at least one of the assemblies 36A, 36B, 36C, 36D, and 36E, or a standalone assembly mounted on the vehicle body 14, and may also be configured as a reflector, as described above. For example, as shown in FIG. 1, auxiliary lighting 36F may be incorporated into a grille of the motor vehicle 10 and used to signal predetermined functions or vehicle operational readiness, such as a state of charge in an electrically powered vehicle.

Figure 2:
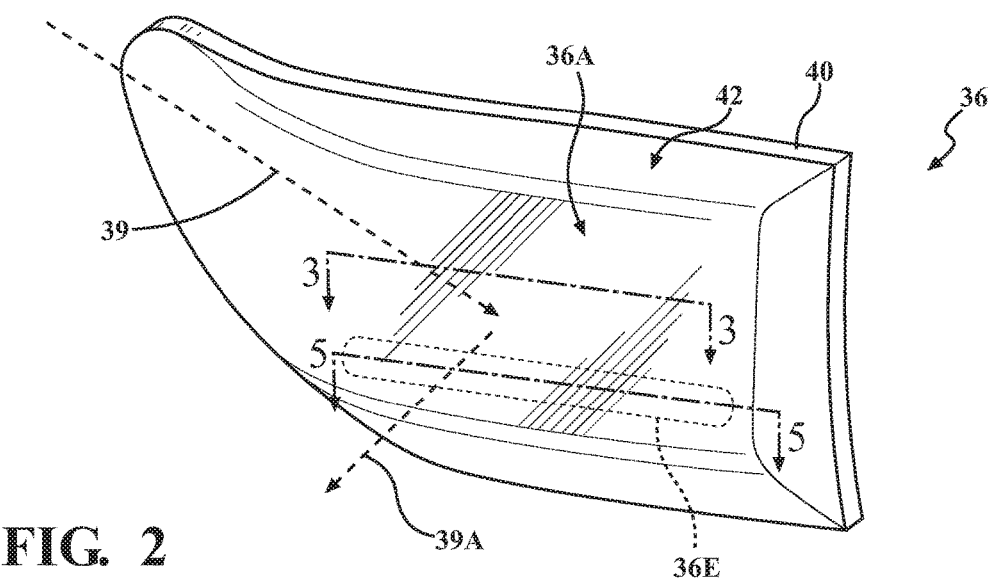
FIG. 2 is a perspective view of a generalized light-emitting assembly shown in FIG. 1, including a turn-signal feature shown in phantom beneath an outer lens, according to the disclosure.

Each light-emitting assembly 36, such as the assemblies 36A, 36B, 36C, 36D, 36E, and 36F, is configured to generate varied or wide-ranging color light, as will be described in detail below. As shown in FIG. 2, an exemplary light-emitting assembly 36 includes an assembly housing 40 and may include an outer lens 42 affixed to the assembly housing, thereby defining an interior space 44 of the subject assembly. The outer lens 42 may be affixed to the assembly housing 40 via various methods, such as integrated snap-locks or stand-alone fasteners (not shown), or by being permanently fused thereto with structural adhesive or sealant, or permanently fused thereto through a welding process. The light-emitting assembly 36 is generally mounted to the vehicle body 14, such as via fasteners extending through dedicated features formed in the assembly housing 40 (not shown).

Figure 3:
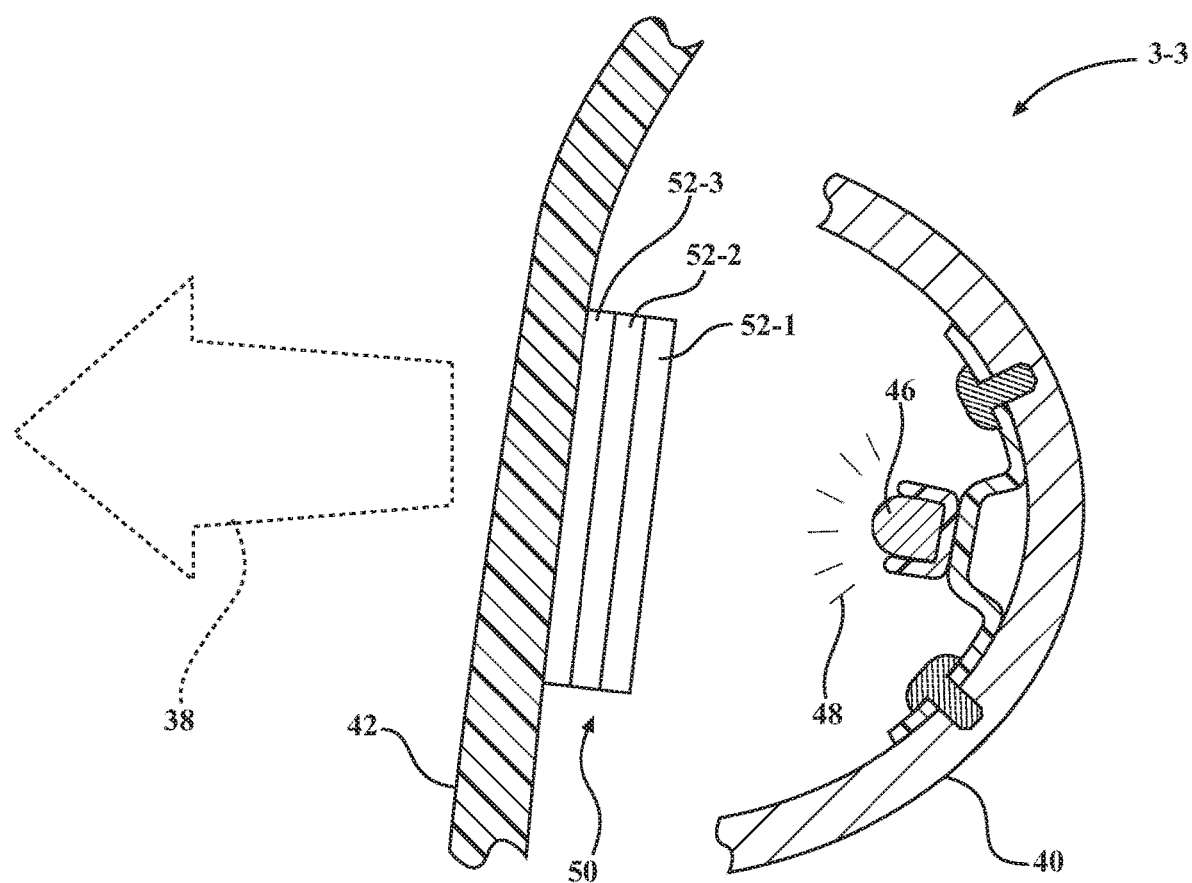
FIG. 3 is a schematic cross-sectional side view of a particular section of the light-emitting assembly indicated in FIG. 2, and showing a white light-emitting diodes (LED) passing its beam of light through a light filter element having a plurality of transparent nanostructured ElectroChromic (TNEC) layers, according to the disclosure.

An up-close image of a representative light-emitting assembly 36, shown as a headlamp 36A, may be seen in FIG. 2. In a cross-sectional plane 3-3 indicated in FIG. 2 and shown in FIG. 3, the light-emitting assembly 36 may also include at least one white light emitting diode (LED) 46. In other words, each LED 46 would be configured to emit a beam 48 of white light. As shown in FIGS. 3 and 4, the white LED 46 is mounted to the assembly housing 40 such that the beam 48 of light may be directed away from the vehicle body 14, such as toward the outer lens 42. The light-emitting assembly 36 also includes a light filter element 50 fixed relative to the white LED 46. The light filter element 50 is arranged in the light-emitting assembly 36 such that the beam 48 of white light generated by the LED 46 passes through the light filter element prior to exiting the light-emitting assembly.

Alternatively, the light-emitting assembly 36 may employ the light filter element 50 but be devoid of white LEDs. In such a light-emitting assembly 36, the light filter element 50 operates as a selective color reflector, as will be described in detail below. The light filter element 50 may be configured as integrated outer lens and filter unit. In the light-emitting assembly 36 employing the white LED 46, the light filter element 50 may be arranged between the white LED 46 and the outer lens 42, with the white LED being configured to direct the beam of light toward the outer lens through the filter element 50. For example, the light filter element 50 may be affixed to the outer lens 42 or mounted directly to the assembly housing 40.

The light filter element 50 includes a plurality of transparent nanostructured ElectroChromic (TNEC) material layers 52. In general, an electrochromic material exhibits a reversible color change upon reduction, i.e., gain of electrons, or oxidation, i.e., loss of electrons, on passage of electrical current after the application of an appropriate electrode potential. In other words, when an ElectroChromic material is arranged between electrodes and a voltage is applied, the ElectroChromic material changes its oxidation state and its optical properties, such as its lighting absorption spectrum. An ElectroChromic device, therefore, operates as a form of electrical capacitor. Various ElectroChromic materials have different lighting absorption spectra and the respective light absorption spectra may be influenced by the voltage applied thereto.

The TNEC layers 52 may be constructed from suitable polymers and include a first layer 52-1 configured to impart a cyan color to the beam 48 of light when subjected to a first predetermined magnitude 54-1 of voltage, i.e., electric potential, a second layer 52-2 configured to impart a magenta color to the beam 48 of light when subjected to a second predetermined magnitude 54-2 of voltage, and a third layer 52-3 configured to impart a yellow color to the beam 48 of light when subjected to a third predetermined magnitude 54-3 of voltage. As shown in FIG. 4 in the light-emitting assembly 36, the TNEC layers 52 are arranged between electrodes of the power source 34. Accordingly, when the specific TNEC layer 52-1, 52-2, or 52-3 is subjected to the respective predetermined magnitudes 54-1, 54-2, or 54-3 of voltage set up by the power source 56, the subject TNEC layer imparts its distinct transmittance color, cyan, magenta, or yellow, to the beam 48 of light generated by the LED 46. When no voltage is passed through the TNEC layers 52-1, 52-2, 52-3, the light beam 48 passes through the light filter element 50 unmodified and maintains its white color. The predetermined magnitudes 54-1, 54-2, 54-3 of voltage may be equivalent or distinct, as required by the specifically selected materials of the respective TNEC layers 52-1, 52-2, 52-3 to generate the requisite transmittance color to the beam 48 of light.

In the light-emitting assembly 36 without white LEDs, or in the assembly with a white LED 46 that is turned off, as the specific TNEC layer 52-1, 52-2, or 52-3 is subjected to the respective predetermined magnitudes 54-1, 54-2, or 54-3 of voltage set up by the power source 56, the subject TNEC layer imparts its distinct reflective color, cyan, magenta, or yellow, to a reflection 39A of the ambient light 39 entering the light-emitting assembly (as shown in FIG. 2). When no voltage is passed through the TNEC layers 52-1, 52-2, 52-3, the ambient light 39 passes through the light filter element 50 and is either dissipated inside the light-emitting assembly 36 or is reflected unmodified in its original color. Accordingly, in such situations, the light-emitting assembly 36 may operate as a selective color reflector.

As shown in FIGS. 1 and 4, the motor vehicle 10 also includes an electronic controller 58. The electronic controller 58 may include a central processing unit (CPU) programmed to control the powertrain 30, the electrical system 32, including the power source 34, the light-emitting assemblies 36, and various other vehicle systems. Alternatively, as shown in FIG. 4, the electronic controller may be a body control module (BCM) 58A specifically configured to regulate the electrical system 32 and the light-emitting assemblies 36. In either of the above configurations, the electronic controller 58 includes a processor and tangible, non-transitory memory, which includes instructions for operation of the electrical system 32 and the light-emitting assemblies 36 programmed therein. The memory may be an appropriate recordable medium that participates in providing computer-readable data or process instructions. Such a recordable medium may take many forms, including but not limited to non-volatile media and volatile media.

Non-volatile media for the electronic controller 58 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the electronic controller 58 may also include a flexible disk, hard disk, magnetic tape, another magnetic medium, a CD-ROM, DVD, another optical medium, etc. The electronic controller 58 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 58 or accessible thereby may be stored in the memory and automatically executed to provide the required functionality of the electrical system 32 and the light-emitting assemblies 36.

The electronic controller 58 is specifically configured to regulate the electric power source 56 and generate voltage across one or more TNEC layers to thereby modify color of the beam 48 of light generated by each white LED 46, i.e., facilitate emission or reflection of a particular color light beam from the respective light-emitting assemblies 36. Accordingly, as shown in FIG. 4, the electronic controller 58 may be programmed with the respective predetermined magnitudes 54-1, 54-2, or 54-3 of voltage. Furthermore, the electronic controller 58 may be programmed to substantially simultaneously subject the second TNEC layer 52-2 and the third TNEC layer 52-3 to the respective second predetermined magnitude 54-2 and third predetermined magnitude 54-3 of voltage to thereby impart a red color to the beam of light 48 generated by the subject light-emitting assembly 36. The electronic controller 58 may also be programmed to substantially simultaneously subject the first TNEC layer 52-1, the second TNEC layer 52-2, and the third TNEC layer 52-3 to the respective first, second, and third predetermined magnitudes 54-1, 54-2, 54-3 of voltage to thereby impart a black color to the beam of light 48 generated by the subject light-emitting assembly 36.

As depicted in a cross-sectional plane 5-5 indicated in FIG. 2 and shown in FIGS. 5A, 5B, 5C, and 5D, the light-emitting assembly 36 may include one or more white LEDs 46 and a series of light filter elements 50. Although the cross-sectional plane 5-5 is specifically taken through the headlamp assembly 36A, nothing precludes a similar configuration from being employed in other light-emitting assemblies 36, such as the tail lamps 36B, stop lamps 36C, CHMSL 36D, turn signals 36E, and various dedicated auxiliary lighting 36F units. Each of the light filter elements 50 shown in FIGS. 5A, 5B, 5C, and 5D include respective first, second, and third TNEC layers 52-1, 52-2, and 52-3. In such an embodiment, the white LED(s) 46 would project the beam(s) 48 into and through the TNEC layers 52 of multiple light filter elements 50. Furthermore, each light filter element 50 may be regulated via the electronic controller 58 to impart a distinct transmittance color to the respective beam 48 of light generated by each individual LED 46. Accordingly, the light-emitting assembly 36 may be configured to generate various light and color patterns for the beam(s) 48 of light from its LED(s) 46 through the multiple light filter elements 50.

Specifically, the electronic controller 58 may be programmed to define the turn-signal function for a particular light-emitting assembly 36, e.g., the tail lamp 36B, by imparting a black color to the beam(s) 48 of light generated by the white LED(s) 46 sequentially via the plurality of light filter elements 50. Such sequential "blacking out" or imparting a black color to individual light filter elements 50 may be achieved via substantially simultaneously subjecting the first, second, and third TNEC layers 52-1 of one particular light filter element 50 to the respective first, second, and third predetermined magnitudes 54-1, 54-2, 54-3 of voltage, as described above. For example, in a cluster of four individual light filter elements 50, as shown in FIG. 5A, initially the beam 48 of light may be transmitted through all four light filter elements.

Next, as shown in FIG. 5B, three of four light filter elements 50 are controlled to transmit the beam of light 48, while the fourth light filter is blacked out, i.e., the first, second, and third TNEC layer 52-1, 52-2, 52-3 of the subject light filter element are substantially simultaneously subjected to the respective first, second, and third predetermined magnitudes 54-1, 54-2, 54-3 of voltage. Then, as shown in FIG. 5C, the beam 48 of light is blocked out at the light filter element neighboring the fourth, already blacked out light filter. Next, as shown in FIG. 5D, a third light filter element 50 next to the already blacked out two light filter elements. Thus, three light filter elements 50 become blacked out and only one of the four light filter elements 50 in the light-emitting assembly 36 continues to transmit the beam 48. Accordingly, such an order of events will generate the appearance of a sequential turn signal 36E.

Additionally, the electronic controller 58 may be programmed to generate a recognizable sequence of colors via a particular light-emitting assembly 36 having a plurality of white LEDs 46. Such a sequence of colors may define a particular auxiliary lighting 36F feature for the vehicle 10, such as upon locking or unlocking of vehicle's doors or activating its powertrain 30. For vehicle operator's convenience, the electronic controller 58 may be programmed with various customizable and storable color and lighting patterns, generally indicated via numeral 60 in FIGS. 4, 5A, 5B, 5C, and 5D, to be generated via the vehicle's particular light-emitting assemblies 36.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A light-emitting assembly configured to generate varied color light, the light-emitting assembly comprising:
    an assembly housing;
    a light filter element fixed relative to the assembly housing and having a plurality of transparent nanostructured ElectroChromic (TNEC) layers;
        wherein when at least one of the plurality of TNEC layers is subjected to voltage, the at least one of the plurality of TNEC layers imparts a distinct reflective color to ambient light entering the light-emitting assembly; and
    a white light emitting diode (LED) mounted to the assembly housing and configured to generate a beam of light, such that the beam of light generated by the white LED passes through the light filter element, wherein, when the at least one of the plurality of TNEC layers is subjected to voltage, the at least one of the plurality of TNEC layers imparts a distinct transmittance color to the beam of light generated by the white LED and passing through the respective light filter element;
        wherein the plurality of TNEC layers includes a first layer configured to impart a cyan color to the beam of light when subjected to a first predetermined magnitude of voltage, a second layer configured to impart a magenta color to the beam of light when subjected to a second predetermined magnitude of voltage, and a third layer configured to impart a yellow color to the beam of light when subjected to a third predetermined magnitude of voltage.

2. The light-emitting assembly according to claim 1, wherein when the second TNEC layer and the third TNEC layer are simultaneously subjected to the respective second and third predetermined magnitudes of voltage, the light filter element imparts a red color to the beam of light.

3. The light-emitting assembly according to claim 2, wherein when the first TNEC layer, the second TNEC layer, and the third TNEC layer are simultaneously subjected to the respective first, second, and third predetermined magnitudes of voltage, the light filter element imparts a black color to the beam of light.

4. The light-emitting assembly according to claim 1, wherein the light-emitting assembly is mounted on a motor vehicle and configured to define a turn-signal function.

5. The light-emitting assembly according to claim 1, further comprising an outer lens affixed to the assembly housing, wherein:
the white LED is configured to generate the beam of light directed toward the outer lens;
the light filter element is arranged between the white LED and the outer lens, and the white LED is configured to direct the beam of light toward the outer lens.

6. The light-emitting assembly according to claim 5, wherein the light filter element is affixed directly to the outer lens.

7. The light-emitting assembly according to claim 1, wherein the light-emitting assembly is a tail lamp of a motor vehicle.

8. The light-emitting assembly according to claim 1, wherein the light-emitting assembly is configured to generate auxiliary lighting of a motor vehicle.

9. A motor vehicle comprising:
a vehicle body arranged along a longitudinal axis and having a first vehicle body end configured to face oncoming ambient airflow when the vehicle is in motion relative to a road surface and a second vehicle body end opposing the first vehicle body end; and
a light-emitting assembly mounted to the vehicle body, configured to generate varied color light, and having:
an assembly housing;
at least one light filter element fixed relative to the assembly housing, each light filter element having a plurality of transparent nanostructured ElectroChromic (TNEC) layers;
wherein when at least one of the plurality of TNEC layers is subjected to voltage, the at least one of the plurality of TNEC layers imparts a distinct reflective color to ambient light entering the light-emitting assembly (thereby generating a color reflector); and
a white light emitting diode (LED) mounted to the assembly housing and configured to generate a beam of light, such that the beam of light generated by the white LED passes through the light filter element, wherein, when the at least one of the plurality of TNEC layers is subjected to voltage, the at least one of the plurality of TNEC layers imparts a distinct transmittance color to the beam of light generated by the white LED and passing through the respective light filter element;
wherein the plurality of TNEC layers includes a first layer configured to impart a cyan color to the beam of light when subjected to a first predetermined magnitude of voltage, a second layer configured to impart a magenta color to the beam of light when subjected to a second predetermined magnitude of voltage, and a third layer configured to impart a yellow color to the beam of light when subjected to a third predetermined magnitude of voltage;
an electric power source; and
an electronic controller configured to regulate the electric power source and generate voltage across the at least one of the plurality of TNEC layers of the at least one light filter element to thereby modify color of the ambient light entering the light-emitting assembly and reflecting off the at least one light filter element.

10. The motor vehicle according to claim 9, wherein the electronic controller is programmed to simultaneously subject the second TNEC layer and the third TNEC layer to the respective second predetermined magnitude and third predetermined magnitude of voltage to thereby impart a red color to the beam of light generated by the light-emitting assembly.

11. The motor vehicle according to claim 10, wherein the electronic controller is programmed to simultaneously subject the first TNEC layer, the second TNEC layer, and the third TNEC layer to the respective first, second, and third predetermined magnitudes of voltage to thereby impart a black color to the beam of light generated by the white LED.

12. The motor vehicle according to claim 11, wherein the light-emitting assembly is configured to define a turn-signal function.

13. The motor vehicle according to claim 12, wherein the light-emitting assembly includes a plurality of the light filter elements, and wherein the electronic controller is further configured to define the turn-signal function by imparting the black color to the beam of light generated by the white LED sequentially via the plurality of light filter elements.

14. The motor vehicle according to claim 9, wherein:
the light-emitting assembly additionally includes an outer lens affixed to the assembly housing;
the white LED is configured to generate the beam of light directed toward the outer lens;
the light filter element is arranged between the white LED and the outer lens; and
the white LED is configured to direct the beam of light toward the outer lens.

15. The motor vehicle according to claim 9, wherein the light-emitting assembly is a tail lamp.

16. The motor vehicle according to claim 9, wherein the light-emitting assembly is configured to generate auxiliary lighting.

* * * * *